Figure 1:
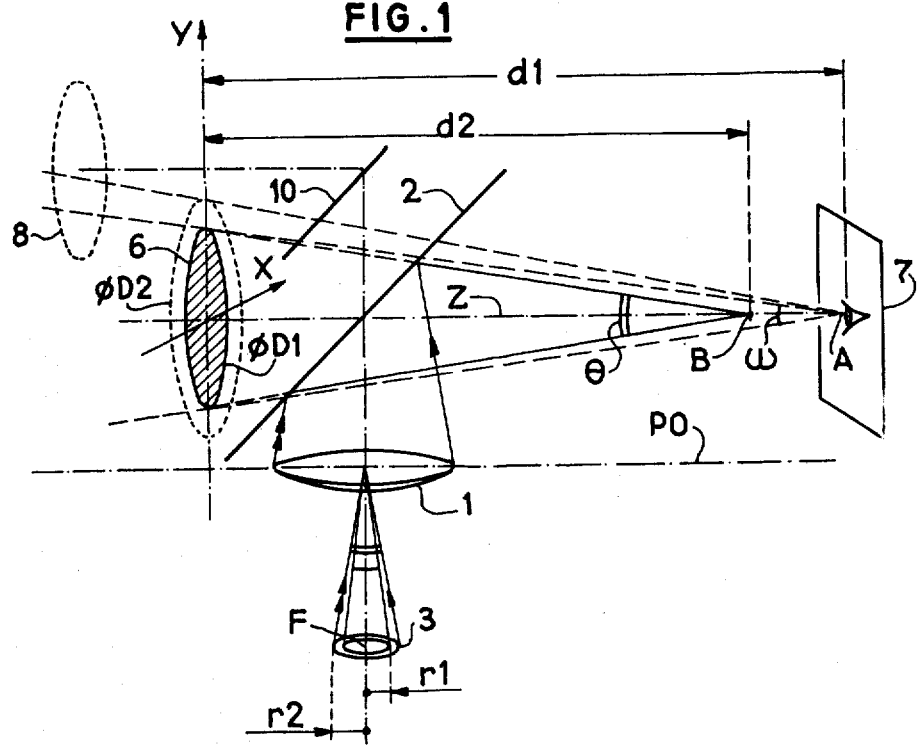

United States Patent [19]

Cojan

[11] 4,225,215
[45] Sep. 30, 1980

[54] DISPLAY INSTRUMENT USING OPTICAL COLLIMATION

[75] Inventor: Yves Cojan, Paris, France

[73] Assignee: Thomson-CSF, Paris, France

[21] Appl. No.: 901,207

[22] Filed: Apr. 28, 1978

[30] Foreign Application Priority Data

May 3, 1977 [FR] France .................. 77 13343

[51] Int. Cl.² .................................. G02B 27/14
[52] U.S. Cl. .................... 350/174; 358/295
[58] Field of Search ........... 350/174, 302, 298, 301; 358/302, 295

[56] References Cited

U.S. PATENT DOCUMENTS

| | | | |
|---|---|---|---|
| 3,778,548 | 12/1973 | Nistri | 350/174 |
| 4,111,527 | 9/1978 | Cojan | 350/174 |

FOREIGN PATENT DOCUMENTS

| | | | |
|---|---|---|---|
| 2185803 | 5/1972 | France | 64/43 |
| 1090904 | 11/1967 | United Kingdom | 350/174 |
| 1358755 | 7/1974 | United Kingdom | 350/174 |

*Primary Examiner*—John K. Corbin
*Assistant Examiner*—B. W. de los Reyes
*Attorney, Agent, or Firm*—Cushman, Darby & Cushman

[57] ABSTRACT

A display instrument using optical collimation for projecting data into the line of sight of an observer, comprising an optical lens which projects images of luminous objects focused at infinity onto a transparent combining glass. The projected images of the luminous objects corresponding to data are reflected by the glass into the observer's line of sight. A semi-transparent optical mirror is arranged parallel to the glass at a greater distance from the optical lens, to provide an enlargement in elevation of the original pupil as defined by the outline of the image of the lens through the glass.

10 Claims, 8 Drawing Figures

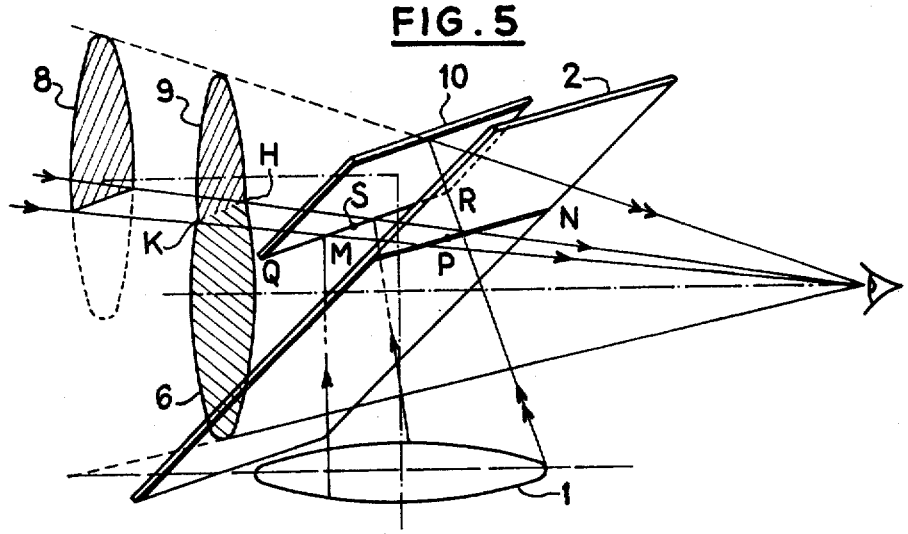
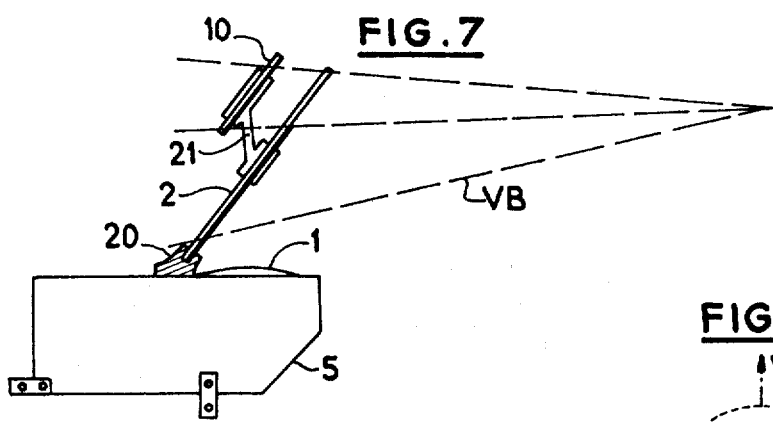
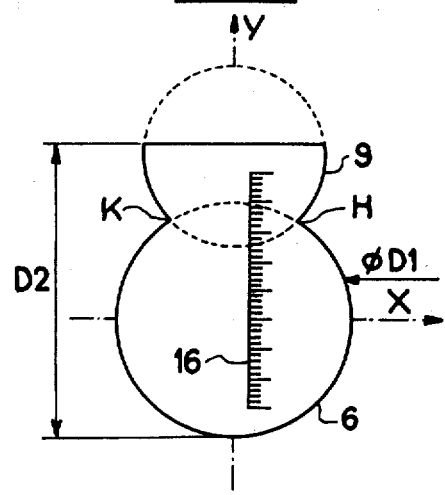

DISPLAY INSTRUMENT USING OPTICAL COLLIMATION

The present invention relates to a display instrument using optical collimation and, more particularly, to an aircraft flight data display instrument known as "head-up display" or "collimating head." This instrument enables flight data to be superimposed on the landscape or sky background seen by the pilot. The data appears in the form of luminous marks or symbols. The latter are produced from corresponding luminous objects, such as back-lighted reticles or a synthetic image on the screen of a cathode ray tube, which are positioned in the focal area of optical lens. The reticle images are projected at infinity onto the reflective surface of a combining glass positioned in the pilot's normal line of sight. The display is thus superimposed on the landscape and eye accommodation either in distance or brightness is unnecessary. An optical mixer device may be used to combine several reticles into one very elaborate display.

The pilot must have a complete vision of the reticle images without having to move his head uncomfortably or without having to come in very close proximity to the transparent screen through which observation takes place.

The outline of the image of the lens in the glass acts as an optical pupil. The field of the equipment therefore consists in monocular vision, in the cone centred on the eye and resting upon the optical pupil and, in binocular vision, in the combination of two cones respectively centred on the eyes of the observer and resting upon the optical pupil. In a given direction of vision, the projected images remain visible for movements of either eye over an area corresponding to that of the optical pupil.

It is important that the optical pupil be of large diameter in order to increase the comfort of the pilot by enabling him to see easily at a sufficient distance from the combining glass.

In practice, any increase in the size of the optical pupil generally takes place at the expense of the compactness and size of the equipment. Specifically, the latter which is intended to be fitted above the instrument panel of an aircraft, must be of small dimensions vertically so as in no way to interfere with the external vision or movements of the pilot. In the case of a collimating head which has good optical characteristics and, particularly, which operates without distortion or parallax, the minimum possible height for the housing is dictated by the diameter of the optical lens.

According to known techniques, the combining glass is arranged to be movable either in translation, or in rotation, or both. The optical pupil remains unaltered from the dimensional point of view but is shifted owing to the movement imparted to the glass, resulting in a virtual enlargement of the pupil due to the shift in the instantaneous field which remains of substantially the same size for small movements of the glass.

In another known technique, an increase in the pupil is achieved by inserting a reflectively deflecting prism between the optical objective and the illuminated objects. The prism has a minor reflecting face parallel to the optical axis and the optical objective is arranged parallel to its major face. Whilst the size of the collimating head remains unchanged, the diameter of the optical objective, and thus that of the optical pupil, is enlarged.

One object of the present invention is to produce an optical collimator device which presents an optical pupil larger in size than the optical objective, whilst at the same time preserving the optical qualities of the apparatus; the optical pupil is enlarged in the vertical direction, representing an increase in elevation, without altering the diameter of the optical lens.

According to the invention there is provided a display instrument using optical collimation for projecting data in the form of luminous marks into the observer's normal line of sight, said instrument comprising: luminous objects representing the said data, an optical objective for projecting an image of the said objects to infinity, a combining glass formed by a plane semi-transparent mirror for reflecting the said projected image into the said line of sight and, optical means for enlarging the original optical pupil as defined by the outline of the image of the objective through the combining glass, by producing an additional optical pupil which, in conjunction with the original optical pupil, forms an enlarged resultant pupil, the said means comprising a second plane semi-reflective glass which is arranged parallel to the said first glass at a greater distance from the objective and which causes the said original optical pupil to be enlarged in elevation.

Figure 2:
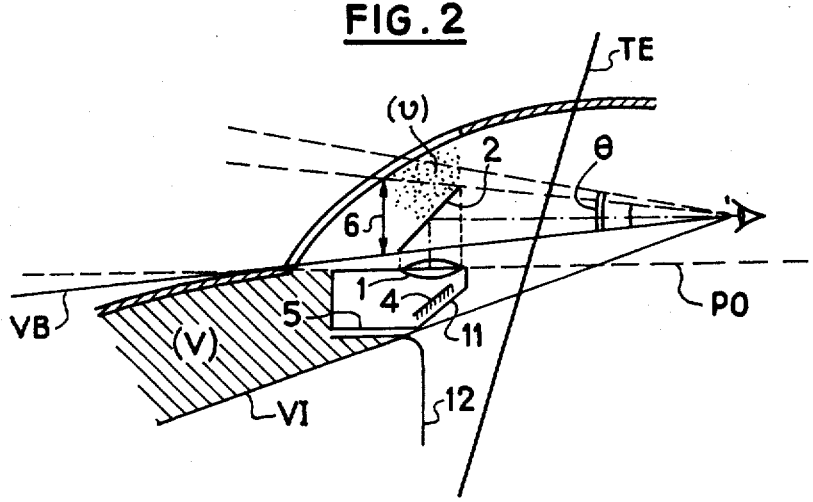

Other features of the invention will be more apparent to those skilled in the art upon a consideration of the following description and accompanying drawings, which show:

FIG. 1, a simplified diagram of a collimating display instrument according to the invention;

FIG. 2, the siting of a head-up display in the cockpit,

FIGS. 3 to 6, diagrams relating to the operation and production of an collimating display instrument according to the invention, FIG. 7, an example of arrangement of the optical elements on the housing of the collimating head; and FIG. 8, an example of a symbol of large size projected through the enlarged resultant pupil.

FIG. 1 shows, in a simplified fashion, collimating display instrument comprising an optical objective 1 which is represented by a lens whose diameter is called D1, a plane semi-transparent glass 2, and illuminated objects located at 3 in a focal area of the objective, F representing the focus on the optical axis. To reduce the height of the apparatus, it includes a reflecting mirror which is shown at 4 in FIG. 2, the whole assembly being supported by a housing 5.

The optical pupil of the display instrument is defined by the outline 6 of the image of the lens 1 through in combining glass 2.

For an observer located at A on the optical axis Z, the useful field for viewing the illuminated objects is a cone centred on the eye at A whose base rests on the pupil 6, the angular extent of the field being w at the viewing distance d1 concerned. In the example shown, the apex angle $\theta$ of the field cone would have to be greater than w to allow all the illuminated objects to be seen simultaneously. For this, the viewer would have to be positioned at a maximum distance of d2 from the pupil 6, at point B. When located at A, the viewer can only see simultaneously the objects lying within a reduced focal area corresponding to a circle of radius r1, the overall area having a larger radius r2. To see the objects contained in the ring between the circles of radii r1 and r2, it is necessary for the viewer to move his head in the plane 7 perpendicular to axis Z at A, it being understood that the semi-transparent glass 2 is assumed to be fixed.

Distance d1 represents the minimum possible value for viewing by the pilot under in-flight conditions. It is possible for all the objects to be seen simultaneously provided the optical pupil 6 is enlarged. In the case shown by the Figure, this means obtaining a pupil whose diameter D2 is greater than D1 and is such that the apex angle $\theta$ of the field cone at A is the one required.

As mentioned in the preambule, any increase in the diameter of the objective soon encounters restrictions imposed by bulk and cost. Expedients employing movable glasses also result in more complicated designs and require action by the pilot at the appropriate times.

It should also be remembered that it is not generally necessary to enlarge the pupil in the widthwise direction but rather in the heightwise direction, it being more frequent in practice for the illuminated objects to be spread out in the latter direction, which is represented at Y in the plane of FIG. 1. This is the case particularly when a vertically graduated scale is to be displayed.

To obtain a local enlargement of the pupil in this preferred direction, which may be referred to as an enlargement in elevation, there is positioned, in accordance with the invention, in the space (v) between the windscreen (FIG. 2) and the glass 2, a reflecting optical device 10 which produces a second pupil 8. The device 10 is formed by a second semi-transparent glass parallel to the first, lying at a greater distance from the objective 1. The dimensions and position of the additional glass 10 are so calculated as to produce an overall pupil of the requisite shape and dimensions in the widthwise direction X and the heightwise direction Y to allow all the objects to be seen simultaneously.

In the context of a pilot's display collimator, FIG. 2 shows the restrictions which have to be considered for the purposes for installation. The straight line VB indicates the lower boundary for vision of the outside world and represents the line of the plane extending from the eye of the pilot to the lower edge of the windscreen. Line TE represents the ejection trajectory which defines within the cockpit a space in which instruments or objects liable to hamper possible ejection procedures by the pilot must not be sited, such procedures being likely in particular in military aircraft. In FIG. 2, the head-up-display 11 is fitted in the low position. Instruments on the instrument panel shown at 12 impose an instrument viewing boundary VI which has to be allowed for when siting the display 11. The latter is situated in the space (V) defined between planes VB, VI and TE. The plane of the objective, as indicated by line PO, is generally parallel to the longitudinal axis of the aircraft and the objective is positioned in the highest possible position compatible with the lower boundary of vision VB, meaning that the pupil 6 is tangent at the bottom to line VB.

Figure 3:
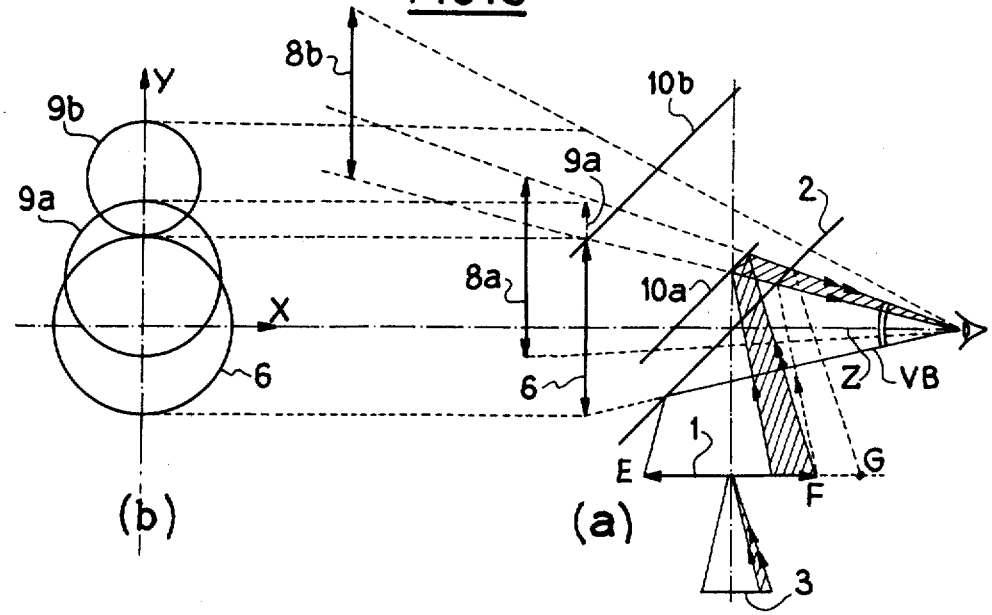
Figure 4:
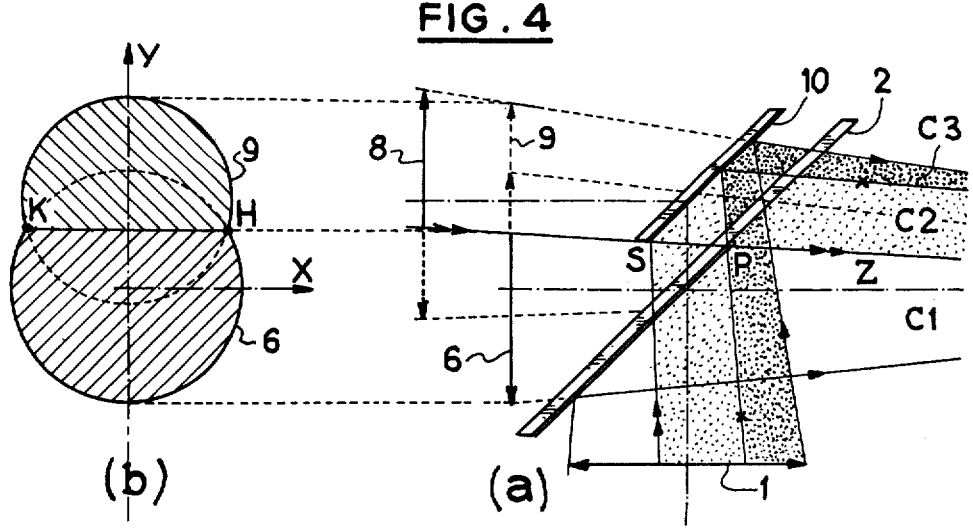
Figure 6:
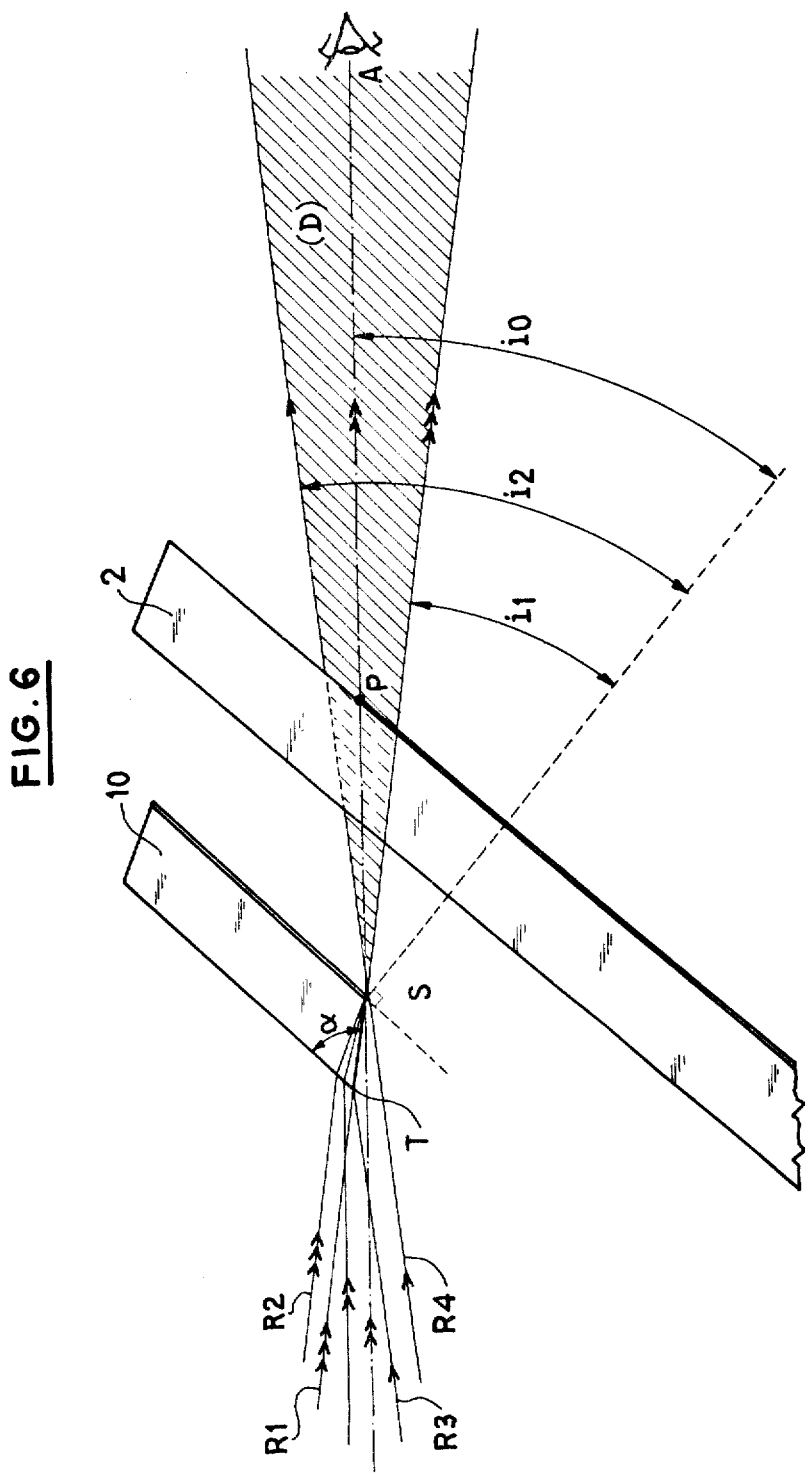

An embodiment of the collimating display instrument will now be described with reference to FIGS. 3 to 6. FIGS. 3 and 4 show the light paths in a plane of representation corresponding to the plane formed by the optical axis and direction Y, this plane being orthogonal to the plane PO of the lens 1. The lower generatrix of the cone of vision, that is to say the lower radius of the field of simultaneous vision, is assumed to coincide with the lower boundary of vision VB. The mean line of sight Z may be shifted to correspond to the axis of symmetry of the observable pupil but this has been ignored in the Figures for reasons of simplicity, remembering that the shift may be small and that the enlargement of the pupil is localised directionally.

FIGS. 3a and 3b are intended to show the change in the pupil as a function of the position of the additional glass 10. The latter is shown in two different positions 10a and 10b in FIG. 3a, where it produces pupils 8a and 8b respectively. FIG. 3b represents the overall pupil obtained which includes, for each position a and b, an additional pupil 9a or 9b which corresponds to the pupil 8a or 8b transposed into the plane of the original pupil 6. It will be noted that the enlargement of the pupil in direction Y is greater when the mirror 10 is further from the objective 1 but that the diameter of the additional part 9 then diminishes. Position 10b is an extreme position in which the two pupils 9b and 6 are tangent. In view of the fact that there is certain spread in the images of the luminous objects in direction X, an intermediate position such as 10a is preferred in order to produce an overall pupil of a certain width at the point where circles 9a and 6 intersect. The light rays which are shown bring out the fact that the enlargement of the pupil in elevation caused by the glass 10a is the same as would be produced by an objective of a larger diameter EG=D2 rather than EF=D1. These rays, which correspond to the hatched zone, must pass through the first glass 2 before being reflected from the additional glass 10. In order in particular that the luminous objects shall be of substantially the same brightness in the overall field, certain arrangements are made which will be described with reference to the following Figures.

At the top, the semi-transparent treatment of the glass 2 does not continue beyond a line MN (FIG. 5) at a point P (FIG. 4a), thus producing a pupil 6 (FIG. 4b) which is bounded at the top by a chord KH of the desired width in direction X. The glass 10 is positioned in such a way that its lower edge QR (point S) corresponds to the chord KH for the viewer in such a way that the pupil formed is that shown at 9, which is bounded at the bottom by this chord.

The materials to render the glasses 2 and 10 semi-transparent are deposited on the side on which the viewer is situated, as indicated in heavy lines in FIG. 4a. Glass 10 is treated uniformly. The other faces of the glasses 2 and 10, which are situated on the same side as the outside world, are treated to be anti-reflective. The lower edge of the glass 10 is finished to an optical polish to prevent interference images, in the form of parallel bars, from being formed by this lower face when seen through the semi-transparent glasses 10 and 2, particularly when the ambient light level becomes high. In addition, the lower edge ST is of a particular outline shape as shown in greater detail in FIG. 6. The displacements due to the glass 2 have been ignored for reasons of simplicity. An angle io is formed between a normal to the glass 10 and the straight line SA which joins edge S to the eye of the viewer. This angle is made substantially equal to half the sum of the two angles i1 and i2 indicated, which define in space a dihedral (D), in which the face TS of the glass 10 appears to be of zero width when seen by the viewer, along a line (QR, FIG. 5). Outside this dihedral the viewer sees the edges passing through S and T separately. Angle i1 is defined by rays R1, R2 of direction TS, and angle i2 by the ray R3 which is refracted along TS and the ray R4 lying in the same direction as R3 which passes through S. The angles i1, i2, io and the angle $\alpha$ at which edge TS of the glass 10 is cut are related to one another by the equations:

sin i2 = n cos α (n being the refractive index of the glass 10)

$$i1 = (\pi/2) - \alpha$$

$$io = i1 + i2/2$$

which means the value of α as function of io is given by:

$$\alpha - \text{Arc sin}(n \cos \alpha) = (\pi/2) - 2io$$

The value of io can thus easily be calculated from the position of the pilot and that of the display instrument in the aircraft.

The glass 10 having been cut to shape accordingly, the boundary MPN for the treatment of the glass 2 is so calculated that the line MPN lies in the plane defined by the prospective position A of the viewer and by the line QSR, allowing for the small displacement caused by passage through the parallel-faced transparent plate formed by member 2.

The transmission coefficient T and reflection coefficient R of the glasses 10 and 2 may be calculated to obtain images of the luminous objects of substantially the same order of brightness in the additional part of the field covered by the pupil 9, as are seen in the original field covered by the pupil 6. By way of example, in the case of the glass 2 the factors may be selected in such a way that T=0.6 and R=0.4, and in the case of glass 10 in such a way that T=0.4 and R=0.6, which gives a coefficient of 0.4 for a ray reflected by the glass 2 towards the viewer (zone C1, FIG. 4a) and of 0.6×0.6=0.36 for a ray which is reflected by the glass 10 after passing through the glass 2 (zone C2). Rays coming from the objective which pass through the upper, non reflecting part of glass 2 suffer virtually no losses in the course of their passage and the coefficient for them is 0.6 after reflection at 10 (zone C3). With this same example, the outside world is seen by the viewer with transmission coefficients of 0.6 for zone C1 and 0.4 for zones C2 and C3. Thus, in the case of a head-up-display collimator, objects in the outside world situated at low elevations are seen at a higher brightness level than those situated at higher elevations, which is advantageous, whilst the luminous symbols are seen at substantially the same order of brightness.

In view of the large number of parameters which exist, namely the predetermined position of the viewer point A, minimum distance d1, the lower viewing boundary VB, the ejection trajectory TE, the diameter D1 of the objective, the overall field angle θ to be obtained, the shape of the enlarged pupil, etc. no simple formulae can be drawn up for the dimensions and position of the optical element 10.

The glasses 2 and 10 may advantageously be set up in fixed positions on the housing 5 of the collimator device, as shown in the diagram in FIG. 7, by mechanical connecting members 20 and 21 lying outside the field. Member 20 enables the glasses to be secured to the housing 5; member 21 is laterally positioned and enables the glasses to be set up parallel to one another, there being a member 21 on either side. It is understood that more elaborate arrangements may be made to enable the glasses to be folded down when not in use, and/or to allow the glass 10 to be adjustably mounted. The arrangements must however ensure that the two mirrors 2 and 10 remain in exactly parallel positions, which can be achieved, for example, with an arrangement of the deformable parallelogram type and end-of-travel stops.

The dimensions of the mirror 10 and in particular its width QR are preferably decided, as described with reference to FIGS. 5 and 8, in such a way that the pupils 9a and 6 intersect along a sufficiently wide chord KH. In this way the resulting pupil is of a size in direction X sufficient to allow moving luminous objects to be projected which may be fairly far away from the vertical axis of symmetry Y. As an example of the projection of a symbol of large dimensions, a graduated vertical scale 16 is shown in FIG. 8.

The semi-reflecting mirror 10 is not restricted to the rectangular shape and its lateral edges may be shaped to give the pupil 8 a desired format.

For reasons of simplicity the field of vision of the pilot has been likened to a cone whereas in fact it consists of two cones, resulting from the fact of binocular vision, but this in no way affects the method employed in accordance with the invention to enlarge the pupil of the collimator device without altering the sizes of the objective and the housing.

Of course the invention is not limited to the embodiment described and shown which was given solely, by way of example.

What is claimed is:

1. A display instrument using optical collimation for projecting data in the form of luminous marks into the observer's normal line of sight, said instrument comprising: luminuous objects representing said data, an optical objective for projecting an image of said objects to infinity, a combining glass formed by a first plane semi-transparent mirror for reflecting said projected image into said line of sight, and optical means for enlarging the original optical pupil as defined by the outline of the image of the objective through the combining glass, by producing an additional optical pupil which, in conjunction with the original optical pupil, forms an enlarged resultant pupil, said optical means for enlarging comprising a second plane semi-reflective glass which is arranged parallel to said first glass at a greater distance from the objective and on the opposite side of said combining glass from said optical objective and which causes by transmission through said combining glass and reflection on said second semi-reflective glass said original optical pupil to be enlarged in elevation.

2. A display instrument according to claim 1, wherein the said glasses are treated to be semi-transparent on the face orientated towards the objective, the semi-transparent treatment being performed on the second glass for the whole of its extent and terminating at a determined upper limit in the case of the first glass.

3. A display instrument according to claim 2, wherein the limit of the semi-transparent treatment of the first glass is a line whose direction is parallel to the lower edge of the second glass and perpendicular to the direction of the enlargement in elevation, the position of this line being predetermined, in particular as a function of the positions of the viewer and of the intended additional pupil, in such a way that it is situated substantially in the plane which passes through the said lower edge and the eye of the viewer.

4. A display instrument according to claim 3, wherein the objective being circular, the said line and the said lower edge are so positioned that the additional circular pupil merges with the original circular pupil along a chord (KH) of predetermined width.

5. A display instrument according to claim 2, wherein the faces of the glasses which are orientated towards the outside world are treated to be anti-reflective over the whole of their extent.

6. A display instrument according to claim 5, wherein the lower edge of the second glass is finished to an optical polish.

7. A display instrument according to claim 6, wherein the said lower edge is cut in a special fashion so that its plane forms, with the plane of the second glass, an angle of cut $\alpha$ whose value is substantially given by the equation:

$$\alpha - \text{Arc sin} (n \cos \alpha) = (\pi/2) - 2 \, io$$

in which io is the angle between a normal to the second glass and the plane which passes through the eye of the viewer and the lower edge of the second glass situated on the side which is treated to be semi-transparent.

8. A display instrument according to claim 7 wherein the transmission and reflection coefficients of the glasses are so calculated that the said objects are of substantially the same brightness whether they are viewed in the zone of the field whose base rests on the original pupil or in the complementary zone of the field whose base rests on the additional pupil.

9. A display instrument according to claim 8, wherein the transmission coefficient of the first glass is substantially 0.4, that of the second glass being substantially 0.6.

10. A head-up-display produced in accordance with claim 1, the said collimator being fitted in such a way that the optical pupil is tangent at the bottom to the lower boundary of vision of the pilot and wherein the glasses are fitted in positions which are fixed from the point of view of their relative locations, to give an enlarged pupil of predetermined shape.

* * * * *